United States Patent
Smith

(10) Patent No.: US 7,534,378 B2
(45) Date of Patent: May 19, 2009

(54) PLASTIC FORMING PROCESS MONITORING AND CONTROL

(75) Inventor: Roger P. Smith, Perrysburg, OH (US)

(73) Assignee: Rexam Prescription Products Inc., Perrysburg, OH (US)

( * ) Notice: Subject to any disclaimer, the term of this patent is extended or adjusted under 35 U.S.C. 154(b) by 558 days.

(21) Appl. No.: 10/793,522

(22) Filed: Mar. 3, 2004

(65) Prior Publication Data

US 2005/0194705 A1    Sep. 8, 2005

(51) Int. Cl.
  B29C 45/76    (2006.01)
  B29C 49/78    (2006.01)

(52) U.S. Cl. .................. 264/40.1; 264/40.5; 264/40.6; 264/328.1; 700/200

(58) Field of Classification Search ............... 264/40.1, 264/40.5, 40.6, 328.1; 700/200; 425/136, 425/144, 145
See application file for complete search history.

(56) References Cited

U.S. PATENT DOCUMENTS

| | | | |
|---|---|---|---|
| 3,704,362 A | 11/1972 | Kolby et al. | |
| 3,840,312 A | 10/1974 | Paulson et al. | |
| 3,982,440 A | 9/1976 | Groleau et al. | |
| 4,120,629 A | 10/1978 | Christian et al. | |
| 4,146,601 A | 3/1979 | Bishop | |
| 4,674,053 A | 6/1987 | Bannai et al. | |
| 4,694,158 A | 9/1987 | Leser | |
| 4,740,148 A | 4/1988 | Fujita et al. | |
| 4,762,544 A | 8/1988 | Davey | |
| 4,805,112 A | 2/1989 | Neko | |
| 5,049,750 A * | 9/1991 | Hoshino et al. | 250/341.1 |
| 5,062,052 A | 10/1991 | Sparer et al. | |
| 5,062,053 A | 10/1991 | Shirai et al. | |
| 5,216,617 A | 6/1993 | Kamiguchi et al. | |
| 5,225,122 A | 7/1993 | Inaba et al. | |
| 5,229,952 A | 7/1993 | Galloway et al. | |

(Continued)

FOREIGN PATENT DOCUMENTS

CH    679564    3/1992

(Continued)

OTHER PUBLICATIONS

Rosato, Dominick et al., Injection Molding Handbook, 3rd edition, Kluwer Academic Publishers, pp. 1127-1144.*

*Primary Examiner*—Jill L Heitbrink
(74) *Attorney, Agent, or Firm*—Reising Ethington P.C.

(57) ABSTRACT

A method of manufacturing and certifying operation of a system for producing plastic containers using equipment having at least one controllable action that affects quality of containers produced by the equipment includes inspecting raw materials for parameters that affect manufacturability and acceptability of containers produced from such materials, monitoring operation of the equipment including the at least one controllable action, inspecting containers produced by the equipment for variations that affect acceptability of the containers, automatically controlling operation of the equipment to eliminate variations in response to information obtained during the inspecting and monitoring steps, and certifying acceptability of containers produced by the equipment. In one presently preferred embodiment, some or all of these steps can be carried out automatically, such as by a controller that monitors the various steps and operational parameters of the manufacturing process to ensure compliance with predetermined limits for each step and operational parameter.

36 Claims, 1 Drawing Sheet

U.S. PATENT DOCUMENTS

| | | | |
|---|---|---|---|
| 5,259,716 A | 11/1993 | Hoshino et al. | |
| 5,275,768 A | 1/1994 | Inaba et al. | |
| 5,301,120 A | 4/1994 | Magario | |
| 5,309,369 A | 5/1994 | Kamiguchi et al. | |
| 5,316,707 A | 5/1994 | Stanciu et al. | |
| 5,325,287 A | 6/1994 | Spahr et al. | |
| 5,344,301 A | 9/1994 | Kamiguchi et al. | |
| 5,350,547 A | 9/1994 | Yamaguchi et al. | |
| 5,371,931 A * | 12/1994 | Kawana et al. | 29/33 K |
| 5,470,218 A * | 11/1995 | Hillman et al. | 425/144 |
| 5,550,744 A | 8/1996 | Steinbichler | |
| 5,645,775 A | 7/1997 | Spahr et al. | |
| 5,792,483 A | 8/1998 | Siegrist et al. | |
| 5,815,397 A | 9/1998 | Saito et al. | |
| 5,861,118 A | 1/1999 | Hokino et al. | |
| 5,870,305 A | 2/1999 | Yokoyama | |
| 5,898,591 A | 4/1999 | Hettinga et al. | |
| 5,918,191 A | 6/1999 | Patel | |
| 5,943,240 A | 8/1999 | Nakamura | |
| 6,000,831 A | 12/1999 | Triplett | |
| 6,051,170 A | 4/2000 | Kamiguchi et al. | |
| 6,073,059 A | 6/2000 | Hayashi et al. | |
| 6,145,022 A | 11/2000 | Takizawa et al. | |
| 6,165,395 A | 12/2000 | Kieras et al. | |
| 6,185,477 B1 | 2/2001 | Palm et al. | |
| 6,192,283 B1 | 2/2001 | Holowko | |
| 6,272,398 B1 | 8/2001 | Osborne et al. | |
| 6,275,741 B1 | 8/2001 | Choi | |
| 6,287,491 B1 | 9/2001 | Kilim et al. | |
| 6,301,515 B1 | 10/2001 | Wagner | |
| 6,311,101 B1 | 10/2001 | Kastner | |
| 6,338,004 B1 | 1/2002 | Usui | |
| 6,546,311 B2 * | 4/2003 | Brown | 700/200 |
| 6,878,316 B1 * | 4/2005 | Cochran et al. | 264/40.1 |
| 2002/0079607 A1 | 6/2002 | Hawley et al. | |
| 2003/0069795 A1 * | 4/2003 | Boyd et al. | 705/22 |
| 2003/0175375 A1 * | 9/2003 | Bodmer et al. | 425/155 |

FOREIGN PATENT DOCUMENTS

| | | |
|---|---|---|
| EP | 0511637 | 11/1992 |
| EP | 0710536 | 5/1996 |
| EP | 0756219 | 1/1997 |
| EP | 1175990 | 1/2002 |
| EP | 1348932 | 10/2003 |
| GB | 1591470 | 1/1978 |
| GB | 2262905 | 7/1993 |
| JP | 63166513 | 7/1988 |
| JP | 1104500 | 4/1989 |
| JP | 4246523 | 9/1992 |
| JP | 07-157060 | 6/1995 |
| JP | 7-157060 * | 6/1995 |
| JP | 2003-50614 * | 2/2003 |

* cited by examiner

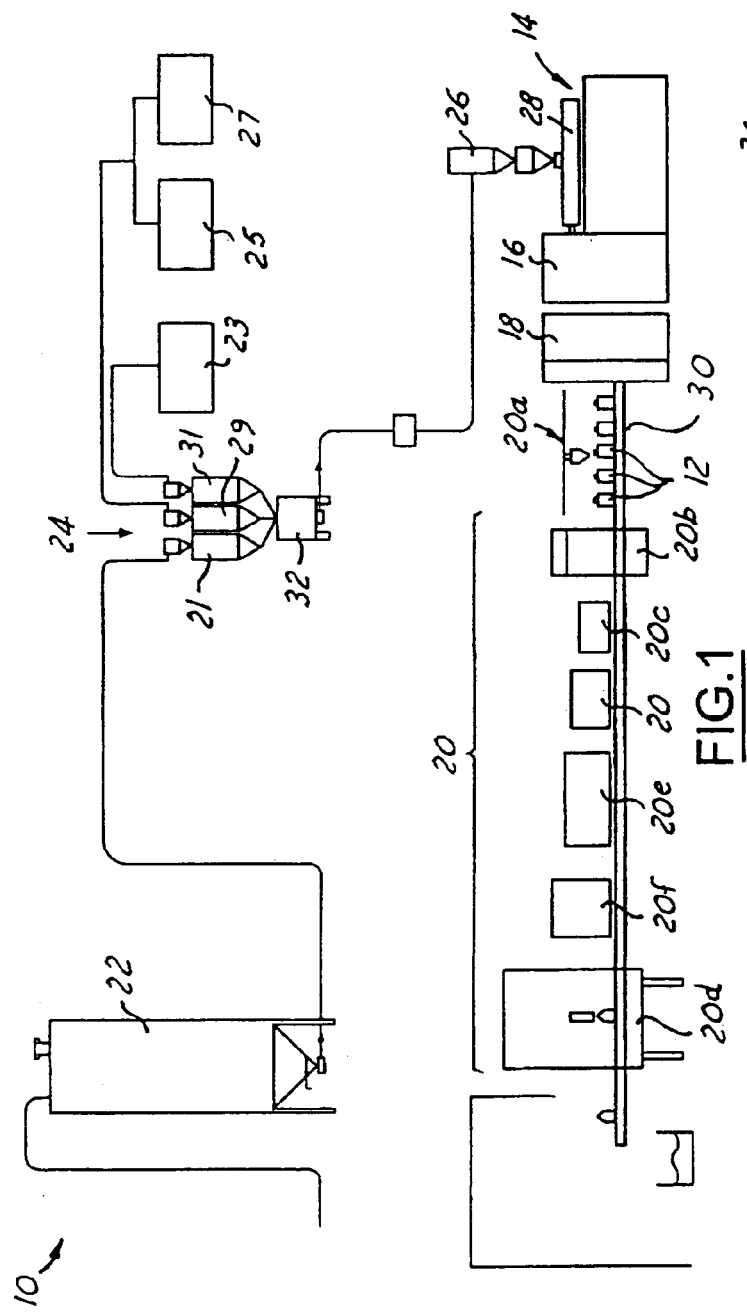
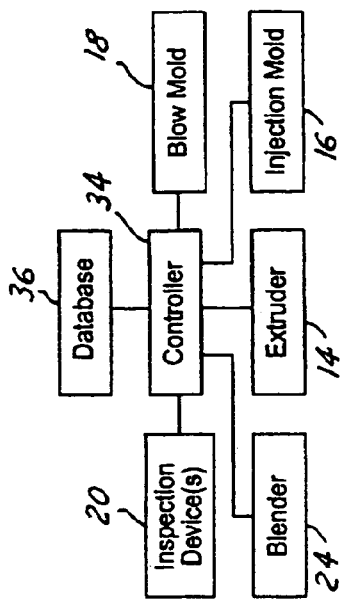
FIG.1
FIG.2

PLASTIC FORMING PROCESS MONITORING AND CONTROL

FIELD OF THE INVENTION

This invention relates generally to forming plastics, and more particularly to a system and method for monitoring and controlling a plastic forming process.

BACKGROUND OF THE INVENTION

Various processes can be used to form articles from plastic, including bottles and other containers. The plastic articles can generally be formed at a single site with plastic resin pellets brought to a molding machine and a finished product being removed from the molding machine. In one process, a supply of plastic pellets is maintained in a silo, is blended with other materials, such as color and additives, and is delivered to a material hopper of an extruder wherein the blended materials are melted and mixed so that they are ready for injection into a mold. The melted material is injected into a mold and is cured slightly to form a parison. The parison is then transferred to a blow mold wherein pressurized air is used to mold the parison within the mold cavity. After being molded, the bottles can be flame treated, inspected for leaks or imperfections in the threads or panels, and then packaged with other containers for shipment.

Typically, the various portions of the machine, for example, the extruder, the parison mold, and the blow mold are controlled by a suitable electronic controller, and monitored by an operator of the machine and controller. To ensure quality of the containers being molded, machine operators manually remove samples from the production line at prescribed intervals, inspect the sample bottles, and record the information obtained from the inspection. Both the machine operators and the inspectors are usually required to complete compliance paperwork for various parameters of the manufacturing process and sampled containers indicating that these were within predetermined limits. After all of the compliance paperwork is completed and corrected, a certificate of compliance can be generated for the particular lot or production run of bottles. Changes to the operational parameters of the machine are done by the machine operator in response to information provided by the controller indicting that the machine is operating outside of predetermined limits, or in response to information obtained from sample bottle inspection indicating that the inspected bottle parameters are outside of predetermined quality limits.

SUMMARY OF THE INVENTION

A method of manufacturing and certifying operation of a system for producing plastic containers using equipment having at least one controllable parameter that affects quality of containers produced by the equipment includes inspecting raw materials for parameters that affect manufacturability and acceptability of containers produced from such materials, monitoring operation of the equipment including the at least one controllable parameter, inspecting containers produced by the equipment for variations that affect acceptability of the containers, automatically controlling operation of the equipment to eliminate variations in response to information obtained during the inspecting and monitoring steps, and certifying acceptability of containers produced by the equipment.

In one presently preferred embodiment, some or all of these steps can be carried out automatically, such as by a controller that monitors the various steps and operational parameters of the manufacturing process to ensure compliance with predetermined limits for each step and operational parameter. Operation outside of a predetermined limit for a parameter or step is preferably monitored by the controller and desirably is automatically corrected by the controller to achieve operation within the predetermined limits. For example, a product manufactured outside predetermined limits or parameters may be automatically diverted away from the production line to scrap. The information obtained during the inspection and monitoring steps can be used to generate certificates of compliance and other paperwork documenting the manufacturing process, controls and inspection results. Desirably, the paperwork and certificates can be generated and distributed automatically with minimal or no operator intervention required.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 1 is a schematic diagram of a system for manufacturing plastic articles such as plastic containers; and FIG. 2 is a diagrammatic view of a controller and machine interface according to one embodiment of the manufacturing system.

DETAILED DESCRIPTION OF THE PREFERRED EMBODIMENTS

Referring in more detail to the drawings, FIGS. 1 and 2 illustrate a system 10 for producing molded plastic articles such as plastic containers 12 that, generally, provides a supply of raw materials to an extruder 14 which in turn provides molten material to a mold such as an injection mold 16 to form a parison. The parison is then disposed in a blow mold 18 and blow molded to its desired final shape. The system 10 may also include various inspection devices 20 for inspecting molded containers prior to packaging and shipping the containers.

In more detail, raw material, such as plastic in the form of pellets is brought into the factory and loaded into a silo 22 or other storage container. When needed, the raw material is removed from the silo 22 and transported to a blending system 24 through an associated hopper 21. In the blending system 24, the raw material is mixed with other materials, such as colorant 23 additives 25, and recycled or regrind material 27, usually in dry form. The various materials are preferably provided to the blender through funnels or hoppers 29, 31 and are agitated or otherwise mixed providing a more uniform dry mixture.

From the blending system 24, the raw materials are transferred to a material hopper 26 of the extruder 14 wherein the material is gravity fed into the extruder screw chamber 28. In the extruder 14, the raw materials are melted, mixed together and then accumulated in the extruder. From the extruder 14, at the proper time of the cycle, the melted materials are injected into a cavity of a mold 16, typically over a core. In this preliminary molding stage, the plastic article is called a preform or parison.

After the parison is cured slightly, it is lifted out of the mold 16 and transferred to a cavity of a blow mold 18 wherein pressurized air is introduced into the parison to remove the parison from the core and press the parison against the blow mold to form the plastic container 12. After the blow molding operation, the containers are removed from the blow mold 18 and transferred to an outfeed station where they are typically placed on a conveyor 30 and transferred to subsequent work or inspection stations 20. Subsequent work or inspection stations may include, for example, flame treatment, leak detection, as well as various visual, mechanical electrical or other inspections for various features, characteristics, or imperfections in the threads, the panels or sidewalls of the containers, and the like. Thereafter the containers are typically counted and packaged so they are ready for shipment.

Throughout the process, a wide range of inspections, operational steps and operational parameters are employed to produce plastic containers without unacceptable commercial variations and/or anomalies. For example, without limitation, incoming raw material can be inspected for various parameters affecting quality and the ability to form a finished product. The incoming raw materials may be inspected for such things as presence of contaminants, presence of metal and various mechanical properties such as the melt flow, melt swell index and density of the pellets. Of course, other inspections and/or tests may be conducted on the incoming raw material to ensure its integrity and quality as desired. Information regarding the raw material may also be provided by the supplier of the material. This information can be entered into a controller or database manually, or automatically such as through use of bar codes or other tags, or by electronic or other data transfer.

At the next stage, where the raw materials are blended together, a plurality of additional inspections and operational parameters may be performed or monitored to ensure compliance with predetermined limits for the particular product being made. In the blending system 24, virgin raw materials, such as by way of examples without limitation polyethylene or polycarbouate, may be combined with colorants, other additives and other materials, including process regrind or suitably processed post consumer recycled materials. Each of the materials that are mixed together can be considered "raw materials" with each being inspected and tested. The blending system 24 may include a so-called weight cell blender 32 that mixes or combines the various raw materials according to a prescribed formula or recipe for the product being made to provide each raw material as a percentage of the total composition measured by weight of the materials. Accordingly, the machinery that adds the various raw materials into the blender 24 can be monitored to ensure that the appropriate amount or weight of materials are added to the blender, samples may be taken from the blender to confirm the above, and the output from the blender of the combined raw materials can be monitored and/or sampled and inspected to ensure the appropriate blend of materials is achieved. Further testing of the blended materials for such things as metals or contaminates, can also be conducted at or downstream of the blender. From the blender 24, the combined materials are transferred to the material hopper 26 of the extruder 14 where the materials are fed into the extruder screw chamber 28 where they are melted, mixed together and accumulated in the extruder for subsequent injection. Various operational parameters in the material hopper 26 and in the extruder 14 generally can be tracked, monitored and controlled to ensure operation within predetermined limits. For example, without limitation, the flow rate of material into the hopper and from the hopper to the extruder screw chamber can be monitored, as can the operation of the extruder screw such as its torque and rotational speed. Also, the temperature within the extruder can be monitored and controlled to ensure desired melting, mixture, and curing (or lack thereof) of the materials therein.

From the extruder 14 the melted and mixed plastic material is injected into a mold cavity 16 usually over a core rod, and is cured slightly to form a parison. Several operational parameters can be monitored and controlled to ensure proper operation of the extruder 14 and of the injection process. For example, the pressure at which the melted material is injected in the mold cavity, the temperature of the material in the extruder 14 as it is injected, the time for the injection, molding and curing portions of the cycle, as well as the temperature of the mold 16, and number of cycles or parts formed by the mold 16 either in its life or from its last maintenance or repair, can be controlled or monitored. Each of these parameters or steps is preferably controlled according to a predetermined procedure or recipe for the particular plastic article being formed. Each parameter may have an acceptable range of values or associated tolerance that will produce an acceptable plastic article or may have upper or lower limits or both that must be respected to ensure the quality of the plastic articles being formed.

From the injection mold, the parison is removed from the mold 16 and transferred to a cavity of a blow mold 18 wherein air pressure is introduced to remove the parison from the core rod and press it against the blow mold cavity surface to form the final shape of the plastic article. Various parameters can be monitored and controlled to ensure compliance with the predetermined procedure in this step of the manufacturing process. Some of these parameters include the time required to transfer the parison from the injection mold 16 to the blow mold 18, the pressure introduced into the blow mold 18, the temperature of the blow mold 18, the temperature of the pressurized air the amount of time the pressurized air is introduced into the blow mold 18, among others.

After being blow molded and permitted to cool for a desired period of time, the formed plastic containers are removed from the blow mold 18 and indexed to an outfeed station to be removed from molding machine, such as on a conveyor 30. On the conveyor 30, the formed plastic articles may be moved through a plurality of downstream work and inspection stations 20 to finish the containers 12, inspect the containers 12, ensure compliance with various criteria and to ensure that there are no unacceptable variations and/or anomalies in the containers 12. For example, without limitation, the containers 12 can be flame treated at one station 20a, checked for leaks at a station 20b, inspected visually, electronically, mechanically, or otherwise for contaminants or inclusions in the threads or panels of the containers 12 at other stations 20c, 20d and have various portions measured at other stations 20e, 20f. After all work or inspections, those containers 12 that have passed the inspection process are packaged and made ready for shipment. Those containers 12 that have not passed the inspection process or are produced during a cycle in which operating parameters are monitored to be outside acceptable limits, are scrapped and may be ground or otherwise processed for later use in the same or a different product. The scrap rate, and reasons for rejecting containers 12 can be tracked and monitored for analysis or other reasons. This information may also be used to effect an automatic or operator assisted change or adjustment in one or more controllable actions such as operational parameters (e.g., cycle times, temperatures, pressures, etc.) or procedures to reduce or eliminate rejected containers.

Monitoring the various machines and process steps in this manner will ensure that all of the process parameters used to form the plastic articles fall within prescribed limits, and that the materials used are of acceptable quality and manufacturability. The monitoring of the process parameters and steps is preferably done in real time to provide real time feedback should a process parameter or step fall outside the prescribed limits. The information obtained from the process monitoring is desirably also recorded for historical retrieval, as well to facilitate production of certificates of compliance and other process documentation.

Desirably, various sensors and devices are communicated with a process controller or controllers that both record the information obtained from the sensors and ensure that the sensed parameters fall within the prescribed limits for the particular plastic articles being made. In a preferred embodiment, the controllers are capable of automatically changing at least one controllable action in a process parameter or step that affects quality of containers produced by the machines. Should the corresponding process parameter fall outside predescribed limits, the controllable action can be altered by the electronic controller or processor to, for example, automatically bring the subject process parameter back within the prescribed limits without operator intervention. Desirably, a plurality of process parameters can be automatically monitored and adjusted by the processor or controller to maintain the process parameters within the prescribed limits throughout a production run. Included in these process parameters that can be controlled automatically are at least the operation parameters of blending system (e.g. ratio or mixture of materials), the extruder (e.g. flow rate, temperature, pressure, screw torque, screw rotational speed), the injection mold (e.g. pressure, cycle time, temperature), and the blow mold (e.g. air pressure, air temperature, cycle time, mold temperature).

While FIG. 2 diagrammatically illustrates a controller 34 communicating with the blender 24, extruder 14, injection mold 16, blow mold 18 and inspection devices 20, the controller may include several controllers. The controllers may be associated with different functions or machines and are preferably programmable logic controller (PLC). For example, the controller may include a machine logic controller and a heat or temperature controller. The machine logic controller can interface with the various machines and sensors to set certain operational parameters (e.g. cycle times, pressures, etc.) and ensure the appropriate parameters are met in operation. The heat controller ensures the machines and systems operate at the proper temperature throughout the manufacturing process and can indicate a fault in the heating system to other controllers or systems.

Also preferably, plastic articles produced when a process parameter is outside of its prescribed limits, are preferably automatically quarantined as they may contain unacceptable variations or anomalies. The quarantined bottles can be subsequently inspected to determine if they comply with predetermined parameters or if they have unacceptable variations and must be rejected or scrapped. Preferably, the machine monitoring is integrated so that all information obtained for a particular lot of material or production run of bottles can be readily obtained and used, for example, to generate a certificate of compliance for the corresponding bottles produced.

In one presently preferred embodiment, the machine line is preferably automatically configured in response to a tooling change, such as when one or more of the molds used to form the plastic articles are changed. The molds may have a tag or other identifier that is sensed by or communicated to the controller when it is installed. Based on the mold that is installed, the controller can determine the plastic article desired to be formed, and can retrieve the predetermined process parameters and steps required to form the container. This information may be stored in a central server, network or database accessible by the controller. Accordingly, with this information, the controller can configure and operate the various machines to provide the desired material composition, and to process and mold the material with the desired temperatures, pressures, cycle times and inspection criteria.

In one preferred implementation, the identifier on the tool, such as a mold, is an RF or radio frequency tag that is automatically sensed by or communicated to the controller or other receiver or relay device upon installation. From the tag information the controller can configure the machine line and process parameters in accordance with a predetermined recipe or process map associated with the tool. Of course, identifiers other then RF tags may be used so that the system can automatically identify the tool being installed, or an operator may input a code associated with the tool from which the controller can determine the tool being installed and the product to be made.

The controller may communicate with a database 36 (FIG. 2) or other source of information that contains the process parameters and predetermined limits or tolerances for a plurality of different tools and different plastic articles to be made. Desirably, a wide range of process parameters and steps can be automatically set based on the particular tool installed in the system. For example, the operating pressures, temperatures and cycle times can be communicated from a database 36 to the controller 34 and from the controller 34 to the particular machines 14, 16, 18, 20, 24 to provide the criteria and parameters for acceptable formation of the desired plastic articles. One example of a database is Smart Stream by D & B. Once the tool and product to be made is known or determined, the blender ratios can be set for the proper material mixture, the extruder parameters can be set and the molding and post molding operations and inspections can be set in accordance with the desired product to be made. Any items that need to be manually set can be communicated to the operator, such as by display of appropriate information on a monitor, hard copy printout, or generated and stored file information for the operator's review.

The identifying tag on the tools can also be useful in tracking the number of cycles for which the tool has been used, number of products produced by the tool, and maintenance requirements for each tool. While the tool is in use, the number of cycles on the tool can be recorded and stored in a database. The database or controller can provide an indication when maintenance needs to be completed on the tool for various maintenance procedures required based on the completed number of cycles in each tool. The operator or other person or controller can automatically be notified when maintenance is required on individual tools. And lifetime maintenance records can be kept by tool in the server, or otherwise displayed or communicated to other controllers or individuals.

Automatic product sampling can also be included in the machine monitoring process, and controlled by the controller. Currently, machine operators manually pick-up and remove samples of formed containers at prescribed intervals, inspect those containers, and record the information obtained from the inspection. However, conflicts in the operator schedule or other reasons can prevent the sample containers from being picked up and inspected at the proper intervals. Accordingly, automatically removing sample containers from the production run at prescribed intervals reduces the burden on the operator and reduces the error caused by inconsistent sampling. The sample containers removed from the production run can be automatically inspected, such as by an appropriate inspection machine, or can be inspected by the operator or other quality control technician. The information from the sample container inspection can be included with the information obtained from the process monitoring, can be stored in the historical database or files, and can be used for compliance paperwork. Should one or more sample containers fail inspection, the information relating to the failure can be used to change a process parameter (either via the operator or automatically such as by the controller), or to change the predetermined limits or tolerances for the process parameters if the defective container was manufactured within the previously set limits or tolerances for the corresponding process parameter.

The efficiency of the production line can be tracked by tracking the production rate of acceptable product as well as the down time of the production line. Tracking of total production, down time of the machine, reasons for the downtime, offware and reasons for offware can be tracked and reported to a central database or to the controller. The downtime can be tracked by cause. For downtime caused by a scheduled occurrence in the process, such as maintenance on one or more tools or machines, the cause of the downtime can be automatically relayed to the controller or database. Downtime caused by human input or human error can be tracked by requiring the operator to input the reason for the downtime prior to restarting of the production line.

The information acquired during the machine monitoring, product sampling and machine line configuration phases can be incorporated in a database or in the controller to provide information for various lots or production runs of containers demonstrating the various operational parameters under which the containers were made, and the various inspection results and statistical analysis thereof. This information can be used to print various reports, to complete compliance paperwork either automatically or manually, and to produce certificates of compliance for the containers. With the operational parameters and other compliance paperwork data being stored electronically either in the processor, controller or database, the compliance paperwork and certificates of compliance can be transmitted electronically to substantially anywhere in the world, and can be provided in hard copy form and included with boxes of containers prior to shipment. Automatically generating the compliance paperwork and certificates of compliance can eliminate or reduce human error, greatly reduce or eliminate the burden on machine operators to generate these documents, and increase the availability and efficiency of creating these reports. Existing machines can be retrofitted with an appropriate interface allowing them to be networked together and with the controller for appropriate communication and monitoring between them. Newer machines are preferably provided with more advanced processing and networking capabilities including advanced PC based HMI systems or other advanced controls and networking interfaces to facilitate implementation of the production line integration, monitoring and configuration system for producing plastic articles.

Personnel associated with the manufacturing process, such as material handlers, equipment operators and inspectors can be tracked and recorded. One way to do this is with employee identification (ID) cards or tags commonly used for security purposes in many buildings. The ID cards or tags could be automatically sensed by an appropriate sensor communicated with, for example, the controller. The ID cards could also be scanned or swiped through a card reader operable to identify and record the identity of people associated with the manufacturing process. The ID cards could also be used for security, safety or other control reason and can be necessary to start, unlock or control various features or machines. Also, different people may be given different access to machines or information and the approved access of a person can be verified or determined by their ID card, or other arrangement or identifier such as by logging onto a network, entering a password, or the like. In addition to controlling machine, system or information access, the employee identification scheme can also be used to track the actions taken by each employee for quality control or other reasons. For example, before a machine setting can be altered, the employee who wants to alter the setting must identify himself (such as with an ID card, code, password, etc.) to provide the access to do so and to identify that employee as the person who altered the setting.

Desirably, the entire process, from initial inspection of raw materials to final packaging of finished containers can be accomplished in an integrated production line and monitored so that compliance with all process parameters can be ensured. Plastic articles formed according to the process parameters can be issued an appropriate certificate of compliance and those manufactured with one or more process parameters outside of prescribed limits can be quarantined for later testing, if appropriate. Desirably, the certificates of compliance can be automatically generated or generated with minimal operator input, and the action of quarantining bottles formed outside of process parameters can occur automatically at any of the various forming or inspection stations in the production line. By ensuring that all critical process parameters occur within prescribed limits, the goal is to reduce and even eliminate anomalies or unacceptable variations in the bottles to provide customers with high quality bottles free from unacceptable variations. While it may not be feasible in some production lines to inspect every bottle, statistical analysis of the production runs of bottles can be improved by automatic product sampling at prescribed intervals and by the more detailed process monitoring of the integrated production line as set forth herein. Those of ordinary skill in the art will recognize that the preceding description is provided in terms of description of a presently preferred embodiment and is not intended to limit the scope of the invention as set forth by the appended claims. Various modifications or substitutions can be made to the system and method set forth herein without departing from the spirit and scope of the claims. For example, the machines used in producing the plastic containers have been described as communicating with a controller, although each machine may have its own controller and the controllers may in turn be communicated with a master or central controller or processor. Also, while the particular embodiment set forth is directed to the production of plastic containers, other articles can be manufactured by the system and method described. Of course, other modifications or substitutions can be made and will be readily apparent to those of ordinary skill in the art upon review of this disclosure.

The invention claimed is:

1. A method of manufacturing and certifying operation of a system for producing plastic containers using equipment having at least one controllable parameter that affects quality of containers produced by such equipment and a controller operable to control said at least one controllable parameter at least when said at least one controllable parameter falls outside of a predetermined limit, which includes:
   (a) acquiring information about raw materials including parameters that affect manufacturability and acceptability of containers produced from such materials,
   (b) monitoring operation of said equipment, including an injection mold for forming plastic containers and having said at least one controllable parameter,
   (c) inspecting containers produced by said equipment for anomalies that affect acceptability of said containers,
   (d) based upon information obtained in at least one of said steps (a), (b) and (c), automatically adjusting with the controller, based on at least one predetermined limit, said at least one controllable parameter so that said at least one controllable parameter is within said predetermined limit to eliminate said anomalies, and (e) based upon information obtained in at least one of said steps (a), (b) and (c), automatically certifying to a customer for the containers acceptability of containers produced by said equipment when said equipment was operating within said predetermined limits when said containers were manufactured and unacceptable anomalies were not detected by inspecting the containers.

2. The method set forth in claim 1 wherein said steps (a) through (e) are carried out automatically.

3. The method set forth in claim 1 wherein said step of monitoring said equipment includes monitoring the time of a molding cycle in said mold.

4. The method set forth in claim 3 wherein said step of monitoring said equipment includes monitoring the time of material injection and initial curing in said mold.

5. The method of claim 3 wherein said step of monitoring said equipment includes monitoring the pressure at which said material is injected into said mold.

6. The method of claim 1 wherein said equipment includes a blow molding station wherein a gas under pressure is used to form a plastic container, and said step of monitoring said equipment includes monitoring the pressure of the gas used to form the plastic container.

7. The method of claim 6 wherein said step of monitoring said equipment includes monitoring the duration that the gas under pressure is applied to form the plastic container.

8. The method of claim 6 wherein said blow molding station includes a mold in which the gas under pressure is applied to form the plastic container, said mold being maintained at a predetermined temperature and said step of monitoring said equipment includes monitoring the temperature of said mold.

9. The method of claim 8 wherein said mold is cooled to facilitate cooling and curing a plastic container and said step of monitoring said equipment includes monitoring the time the plastic container is in said mold.

10. The method of claim 1 wherein said step of acquiring information about raw materials includes inspecting the raw materials for contaminants.

11. The method of claim 1 wherein said step of acquiring information about the raw materials includes inspecting the pertinent physical characteristics of the raw materials.

12. The method of claim 11 wherein said raw materials include plastic pellet and an inspected physical characteristic for the plastic pellet includes the melt flow of the plastic pellet.

13. The method of claim 1 wherein said equipment includes an indicator that corresponds to the particular equipment, and said step (b) includes monitoring selected parameters of operation of the equipment based on predetermined limits for said parameters for said particular equipment.

14. The method of claim 13 wherein said indicator includes a radio frequency identification tag that provides a signal to indicate the tooling being used to form the plastic containers.

15. The method of claim 13 which also includes the step of recognizing an indicator of the tooling being used, and monitoring the operation of said tooling based on parameters set for that tooling.

16. The method of claim 13 wherein the determination of the tooling being used based on said indicator occurs automatically, and the parameters of operation and predetermined limits are automatically chosen based on the tooling in use.

17. The method of claim 16 wherein the parameters of operation and predetermined limits are chosen from a database that includes predetermined limits for parameters of operation for a plurality of tools.

18. The method of claim 1 wherein the temperature of said injection mold is monitored in operation.

19. The method of claim 18 wherein the temperature of said injection mold is controlled automatically and adjusted automatically to maintain the temperature in a predetermined range.

20. The method of claim 5 wherein the pressure in said injection mold is controlled automatically and adjusted automatically to maintain the pressure in a predetermined range.

21. The method of claim 1 wherein said equipment includes an extruder used to form plastic containers.

22. The method of claim 21 wherein the temperature of said extruder is monitored in operation.

23. The method of claim 21 wherein the extruder includes a screw driven by a motor, and the operation the screw and motor are monitored in operation.

24. The method of claim 1 wherein said equipment includes a blender used to mix materials that are used to form plastic containers.

25. The method of claim 24 wherein the blender controls the ratios of materials used to form the plastic materials, and the ratios are monitored in operation.

26. The method of claim 25 wherein the ratios of materials mixed in the blender can be automatically controlled and automatically adjusted to maintain the ratios of materials in a predetermined range.

27. The method of claim 1 wherein said step of acquiring information about raw materials includes inspecting the raw materials for said parameters.

28. The method of claim 1 wherein said step of acquiring information about raw materials includes receiving data from a supplier of raw materials.

29. The method of claim 28 wherein the data received from a supplier is verified to ensure compliance with predetermined limits for such raw materials.

30. The method of claim 28 wherein the data received from a supplier is entered into a database and used to certify acceptability of containers produced from said raw materials.

31. The method of claim 1 wherein information obtained from step (c) is used to certify acceptability of corresponding containers.

32. The method of claim 31 wherein information obtained from steps (a), (b) and (c) is entered into a database and used to certify acceptability of corresponding containers.

33. A method of manufacturing plastic containers using equipment having at least one controllable parameter that affects quality of containers produced by such equipment and a controller operable to control said at least one controllable parameter at least when said at least one controllable parameter falls outside of a predetermined limit, which includes:

monitoring operation of said equipment, including an injection mold for forming plastic containers and having said at least one controllable parameter, inspecting containers produced by said equipment for anomalies that affect acceptability of said containers, automatically adjusting with the controller, based on at least one predetermined limit, said at least one controllable parameter so that said at least one controllable parameter is within said predetermined limit to maintain operation of said equipment within predetermined limits and to eliminate anomalies detected by inspecting the containers, and automatically certifying to a customer for the containers acceptability of containers produced by said equipment when said equipment was operating within said predetermined limits when said containers were manufactured and unacceptable anomalies were not detected by inspecting the containers.

34. The method of claim 33 which also comprises the step of:
monitoring an identifier of a tool being used in the manufacture of plastic containers;
communicating the identifier of the tool to the controller; and
wherein the controller automatically adjusts said at least one controllable parameter in response to a change in the tool being used to account for at least one different predetermined limit for the new tool being used.

35. The method of claim 34 wherein the controller is communicated with a database that includes the predetermined limits for a plurality of different tools and in response to a new tool being used the controller automatically sets the predetermined limits for the new tool.

36. The method of claim 35 wherein the database includes predetermined process parameters for at least one plastic article to be formed by each different tool and upon communication of a change in the tool being used, the controller automatically adjusts the process parameters to those associated with the plastic article to be produced using the new tool.

* * * * *